UNITED STATES PATENT OFFICE.

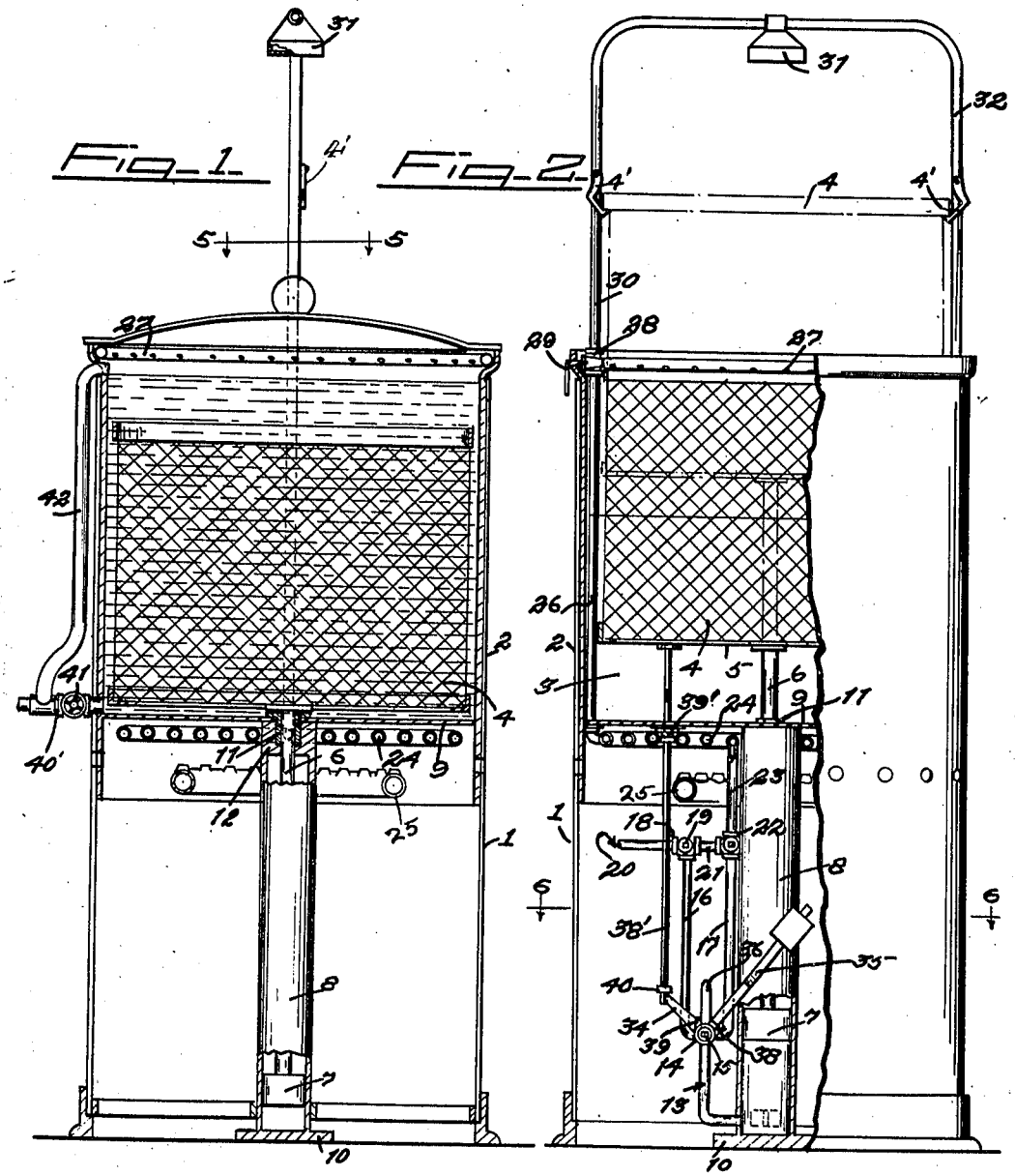

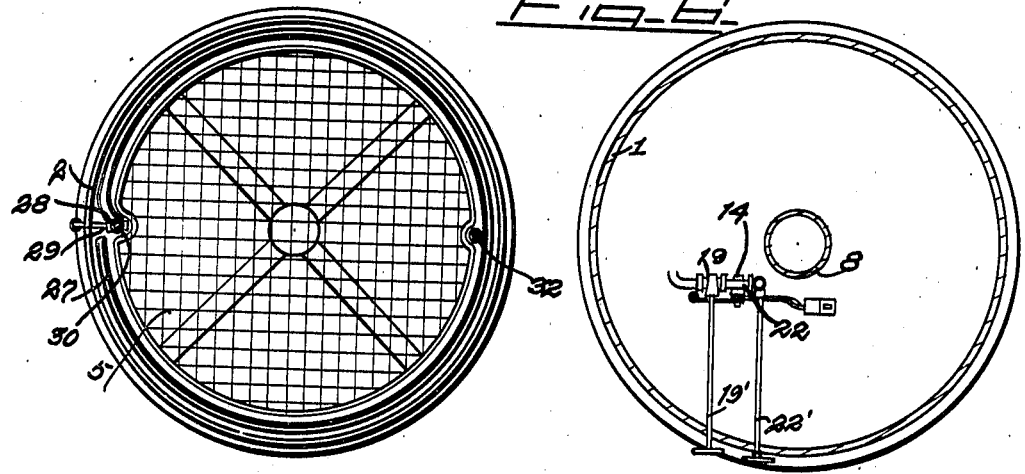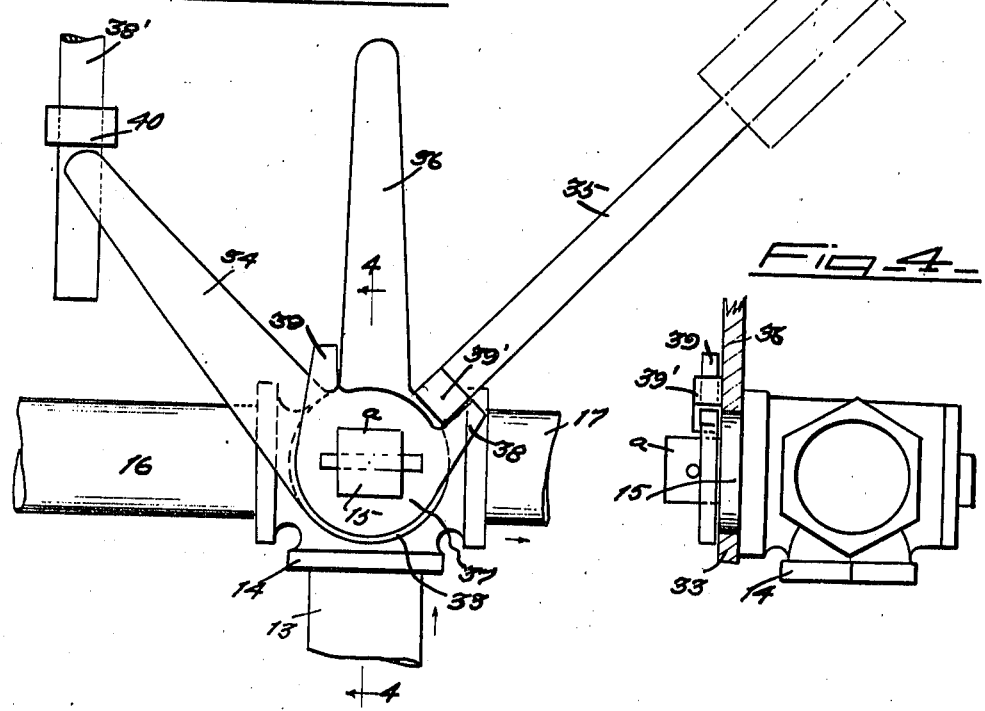

JOSEPH LUTOLF, OF SAN FRANCISCO, CALIFORNIA.

APPARATUS FOR WASHING DISHES.

1,292,495.　　　　　Specification of Letters Patent.　　Patented Jan. 28, 1919.

Application filed August 7, 1917.　Serial No. 184,855.

*To all whom it may concern:*

Be it known that I, JOSEPH LUTOLF, a subject of Switzerland, residing at the city and county of San Francisco and State of California, have invented certain new and useful Improvements in Apparatus for Washing Dishes, of which the following is a specification.

The hereinafter described invention relates to an improved apparatus for use in hotels, cafeterias, cafés, restaurants and eating places generally for the washing of soiled or dirty dishes; the object of the invention being to provide an apparatus, the washing elements of which are automatically thrown into operation by the water supply pressure of the ordinary service pipe, and the production of an apparatus wherein the care of an attendant is not required and one in which the holding receptacle for the dishes will be caused to move up and down or reciprocate within a body of confined water to the proper temperature for cutting or removing grease from the surfaces of the dishes contained therein, so that after a load of dishes has been once placed within the reciprocating cage for the holding thereof, no further care or attention need be given thereto until it is desired to remove the washed and cleaned dishes from within the apparatus.

In the annexed drawings forming a part of the present application, the invention is shown in its preferred embodiment, but it will be apparent that various changes may be made in the details of construction and the arrangement of the working parts without causing or creating a departure from the nature and spirit of the invention and I do not wish to be understood as confining or restricting the invention to the arrangement of the working parts herein shown and described.

For an understanding of the invention reference should be made to the accompanying sheets of drawings, wherein, Figure 1 is a vertical sectional front elevation of the apparatus, illustrating the dish retaining cage or receptacle in its lowered position within the water holding chamber.

Fig. 2 is a broken part sectional side elevation of the apparatus illustrating the dish holding receptacle in its raised position within the water holding chamber disclosing the valve mechanism positioned to permit of the discharge of water from within the piston cylinder.

Fig. 3 is an enlarged detailed view of the valve tripping mechanism controlling the flow, under pressure, of water into the cylinder to actuate the plunger therein for raising the dish holding container, and the release of said water from within the cylinder for permitting the lowering of the said container.

Fig. 4 is a detailed part sectional side elevation of the valve mechanism taken substantially on the line 4—4, Fig. 3 of the drawings viewed in the direction of the arrow.

Fig. 5 is a top plan sectional view taken on the line 5—5 of Fig. 1 of the drawings and viewed in the direction of the arrows.

Fig. 6 is a sectional plan view taken on the line 6—6 of Fig. 2 of the drawings and viewed in the direction of the arrows.

In the drawings, the numeral 1 is used to designate any suitable form of supporting structure or base for the apparatus, which supports and carries the cylindrical casing 2, the interior of which casing constitutes a water holding chamber 3. Within the said chamber is mounted for vertical reciprocating movement a dish holding cage and container 4, the walls of which are formed of reticulated material, said cage provided with a perforated bottom or bottom wall 5. This cage is of a diameter substantially equal to the interior diameter of the water holding casing 2 and is mounted on a vertically movable stem 6 of a piston 7 which works within the piston cylinder 8, interposed between the bottom 9 of the chamber 3 and the base 10 of the supporting structure 1. The stem 6 of the piston 7 works through a suitable stuffing box 11 within the head 12 of the piston cylinder 8, the said cylinder being closed at its bottom. With the interior of the cylinder 8, at a point below the piston 7 communicates a pipe connection 13, the free or outer end of which connects with the T-union 14, within which said union is fitted a three-way rotatable valve 15, and with the laterals of the said union are connected respectively the supply pipes 16 and 17. The pipe 16 connects at its upper end with the T-union 18 within which is fitted a three-way valve 19, one lateral of the said union being connected with the water pressure service supply pipe 20 and the other lateral 21 thereof connecting with a T-union 22, with one of the laterals of which union connects the water connection 17, and from the other lateral of which extends the pipe connection 23. This connection 23 is coupled with the water coil 24, held a slight distance above the gas burner 25 and to the outlet of said coil 24 is connected the vertically extended pipe 26, which at its upper end communicates with the horizontally disposed spray pipe 27, mounted above the water containing chamber 2, there being interposed between the said pipe 26 and the spray pipe 27 the T-union 28, the flow of water through which being controlled by the three-way rotatable valve 29. There is extended from the said union the water pipe 30 which communicates with the sprinkler head or rose 31 and the said pipe 30 is connected to the curved rod 32. The said rod 32 is secured at its lower end to the casing 2 and acts in conjunction with the pipe 30 to form a support for the rose or sprinkler head 31.

On the projecting end of the stem $a$ of the rotatable three-way valve 15 is mounted for free movement a bushing 33, from which is projected at an inclination the trip arm 34, and the weighted lever 35, and intermediate the inclined trip rod 34 and the inclined weighted lever 35 is extended the vertical trip arm 36, Fig. 3 of the drawings. To the said projecting end portion $a$ of the stem of the three-way rotatable valve 15 and in advance of the bushing 33 is fixed the cam plate 37, which cam plate is provided with the projecting spaced lugs or shoulders 38 and 39 between which works or moves the lug 39' forwardly projected from the lower end portion of the inclined lever 35.

From the bottom 5 of the dish holding cage or receptacle 4 is dependent a trip rod 38' which said rod is extended through a stuffing box 39' secured to the bottom of the container 2. This trip rod 38' is carried by the movement of the dish holding cage 4 and to the lower end portion thereof is secured a trip collar 40, which is adapted to engage respectively the trip arms 34 and 36 of the bushing 33. In Fig. 2 of the drawings the trip rod is shown in its raised position and the collar 40 thereof as overlying the free end of the trip arm 34. In this position, the pipe connection 13 through the positioning of the three-way valve 15 is in open communication with the pipe connection 17, and the connection between the said pipe 13 and the service pipe connection 16 is closed. With communication thus established the cage 4 with the weight of the dishes contained therein is free to lower within the chamber 3, carrying therewith the trip rod 38', the collar 40 engaging with the trip arm 34 moves the same downwardly therewith and by so doing turns the bushing on the stem $a$ of the valve 15 until the weighted arm or lever 35 is carried past the center and its projecting lug 39' placed into engagement with the lug 39 of the cam 37. During this descending movement of the cage 4 the piston 7 acts against the body of water in the cylinder 8 and forces the same therefrom through the pipe 13 and the open port of the valve 15 into the pipe 17 and upwardly through said pipe and its extension 23 into the water coil 24 and from within the said coil into and through the vertical pipe 26 into the spray pipe 25 or to the sprinkler head or rose 31, depending upon the turned position of the valve 29. When the weighted arm 35 is carried beyond the center and the lug 39' of said arm placed into engagement with the lug or projection 39 of the cam 37, the weight of the arm 35 acts to throw the bushing 33 over its full distance, carrying therewith the cam 37, which rotates the valve 15 to close its port connection with the pipe 17 and to open connection with the pipe connection 16 of the service pipe 20 and establish communication between the pipe 13 and the said pipe connection 16 and closing communication between 13 and 17. The result of this movement of the bushing 33 and the cam 37 is to place the outer end of the arm 36 above the trip collar 40 which is then in a lowered position, throwing the valve 15 to open communication with the service pipe 20, admitting water under pressure to flow through the pipe 13 into the cylinder 8 below the piston 7 therein with the result that the water pressure so admitted forces upwardly the piston 7 and through its stem 6, the dish retaining cage 4 which carries therewith the trip rod 38'. On the upward movement of the said rod 38' the collar 40 thereof engages with the trip arm 36 and gradually raises the same to turn the bushing 33 and carry the weighted lever 35 beyond the center, at which time the lug 39' thereof will be in engagement with the projection or lug 38 of the cam 37, when the weight of the said arm 35 will swing the same over and rapidly throw the cam 37 to turn the valve 15 to open communication with the pipe connection 17 and close communication with the pipe connection 16, the parts then standing in the position illustrated in Fig. 2 of the drawings. It will thus be noted that the pressure of the water supply service actuates the piston 7 to raise the cage 4 with the dishes therein a given height within the water holding chamber 3, and after the said cage 4 has reached a given height the water supply pressure is automatically cut off and the controlling valve 15 so positioned that the combined weight of the cage and the dishes contained therein will cause a lowering of the piston 7 and an expulsion of the water from within the cylinder 8 through the described connection into the water coil 24 and from the water coil into the washing chamber 3 through the spray connection 27. The ejection of the water through the spray 27 into the chamber 3 thus being an intermittent one and the movement of the cage 4 being a reciprocating one, which said reciprocating motion of the cage with the dishes therein is entirely automatic.

It will be understood that prior to placing the dishes to be washed within the cage 4, that the chamber 3 is filled to approximately one-third of its height with water, which is heated from the burner 25, consequently, the dishes with the cage 4 are subject to the washing action of the heated water during reciprocating movement of the said cage 4.

From the interior of the chamber 3 is extended through the casing or shell 2, a discharge pipe 40', Fig. 1 of the drawings, the discharge of water from within the said chamber being controlled by means of the hand actuated valve 41. From the upper end of the casing 2 is extended an overflow pipe 42, which at its lower end connects with a discharge pipe 40', and through this pipe over-flows the excess of water delivered into the chamber 2. At times, or during such times as it is required to remove the clean dishes from within the cage 4, and in fact to place dishes to be cleaned therein, it is advisable or desirable to raise the said cage 4 and hold the same a distance above the casing 2 in order that the operator may remove the cleaned dishes from within the cage and place dishes to be cleaned therein without placing the hands within the heated water contained within the chamber 3. For this purpose, the operator or attendant of the apparatus throws the valve 22 as the cage ascends by means of a hand wheel 22' to open communication between the service pipe 20 and the pipe extension 17, and closed communication with pipe 23 and by means of a hand wheel 19' to throw the valve 19 to close communication between the service supply pipe 20 and the pipe connection 16. An additional quantity of water under pressure is thus admitted into the cylinder 8 which forces upwardly the piston 7 therein and through the connection of its stem 6 with the dish retaining cage 4 moves the same upwardly a distance out of the washing chamber as shown in Fig. 2 of the drawings, until the upper edge thereof has passed beyond the weighted catches 4', which catches are pivoted to the support for the rose or sprinkler 31. The moment the upper edge of the said cage has passed beyond the swinging catches 4' the weighted portion thereof throws the same inwardly to pass beneath the edge of said cage to hold the same in such raised position, it being understood that the pivoted catches 4' are inclined on their under faces so as to give outwardly to the pressure of the upper edge of the cage 4 thereagainst during the upward movement thereof. When the cage is raised to this position, the operator turns the hand wheel 22' to actuate the valve 22 to open communication of the service supply pipe 20 with the connection 23. If when in this raised position the cage contains dishes which have been washed and desired to be rinsed, it is only necessary for the operator or attendant to throw the valve 29 to close communication between the pipe 26 and the spray and open communication between the said pipe 26 and the pipe 30 leading to the sprinkler or rose 31. With communication thus established, water under pressure flows from the service pipe into the pipe connection 23, through the heating coil 23 and upwardly through the pipe 26 and pipe extension 30 into the rose or sprinkler 31 and is ejected therefrom under pressure as heated water onto the clean dishes within the cage 4 and in this manner the said washed dishes are rinsed with clear unused water.

After the rinsing of the dishes and the removal therefrom from within the cage, it is only necessary if no further dishes are to be washed to throw the valve 19 to cut off the water supply from the service pipe 20. On a fresh load of dirty dishes being placed within the cage 4, the operator first throws the valve 22 to open communication between the pipe connections 17 and 23 and valve 19 to open communication between pipes 20 and 16, after which, the catches 4' are released and the cage permitted to descend by the weight thereof with the weight of the dishes contained therein, during which downward movement the water within the cylinder 8 is ejected therefrom into and through the pipe 13 into the pipe 17 and upwardly through the previously described connections to either the sprinkler or rose 31 or the spray pipe 27, dependent upon the position occupied by the valve 28, and during the full descending movement of the cage 4, the before described trip mechanism operates to automatically establish communication with the service supply pipe 20 for the admitting of water under pressure into the cylinder 8 beneath the piston 7 for the raising of the cage with the dirty dishes therein, it being understood that prior to permitting the cage to descend the valve 19 is turned to open communication between the service supply pipe 20 and the pipe connection 16.

It will thus be seen from the foregoing that the action of the washing apparatus is entirely automatic so far as to the raising and lowering of the cage with the dishes therein to be washed and that during the reciprocating movement thereof within the chamber 3 the dishes contained within the cage 4 are subjected to the washing action of the heated water within the washing chamber 3, and it will be further observed that the discharged water from the cylinder 8 is passed into the washing chamber 3 in the form of heated water to wash the dirty dishes and that at a later period the discharging water from the cylinder 8 is utilized in a heated form for the rinsing of the washed dishes. Upon a proper regulation of the heat from the burner 24 any desired temperature of the water within the washing chamber may be maintained.

The apparatus is so constructed that the normal stroke of the piston 7 within the cylinder 8 will be approximately 3 inches, which will be sufficient to give ample play of the cage within the washing chamber 3. It will be understood that during the operations of the apparatus the proper depth of water within the chamber 3 for the washing of the dishes is obtained from the discharge from the cylinder 8, which gradually increases during the reciprocating movement of the said cage 4 within the chamber 3 and it will be further understood that during the rinsing operation of the dishes that the dirty water contained within the washing chamber 3 is withdrawn therefrom through the discharge pipe 40'.

Having thus described the apparatus what is claimed as new and desired to be protected by Letters Patent is:

1. An apparatus for the described purpose, the same comprising a washing receptacle, a dish retaining means mounted therein for vertical reciprocating movement, valve controlled, fluid pressure means for imparting vertical reciprocating movement to the said dish retaining means, said means adapted for intermittent actuation by the raising and lowering of said dish retaining means, and means whereby the fluid for reciprocating said dish holding means in one direction is delivered into said washing receptacle at a point above said dish retaining means on the movement of said dish holding means in an opposite direction.

2. An apparatus for the described purpose, the same comprising a washing receptacle, a dish holding cage movable therein, a pressure actuated piston for moving said cage in one direction, a cylinder within which said piston is mounted, a source of fluid supply under pressure, means for establishing communication between said source of fluid supply and the cylinder for said piston and connection between said cylinder and the interior of the washing receptacle, and trip means actuated by the reciprocating movement of the dish retaining receptacle for regulating the inlet and outlet of water from within the piston cylinder.

3. An apparatus for the described purpose, the same comprising a washing receptacle, dish retaining means mounted therein for vertical reciprocating movement, fluid pressure operated means for reciprocating said dish retaining means within said washing receptacle, means for supplying wash water to the washing receptacle at a point above said dish retaining means, and devices thrown into action by the reciprocation of the dish retaining means in one direction for automatically controlling the flow of water to the said washing receptacle.

4. An apparatus for the described purpose, the same comprising a washing receptacle, a dish retainer maintained therein for vertical reciprocating movement, a pressure cylinder supporting said washing receptacle and provided with a movable piston connected to the dish retainer valve controlled connections for admitting water under pressure into said cylinder for moving the piston in one direction and directing the discharging water therefrom to the washing receptacle at a point above the dish retainer, and means thrown into action by the reciprocating movement of the dish retainer for automatically controlling the flow of water into and out of the pressure cylinder.

5. The combination with a washing receptacle, of a dish retainer mounted therein for movement, a pressure cylinder, a piston therein connected to the dish-retaining means, valve connections for admitting water under pressure into said cylinder and conveying the discharge therefrom to the washing receptacle, and devices actuated by the movement of the dish cage for controlling the inlet and discharge of water relative to said pressure cylinder.

6. An apparatus for the described purpose, the same comprising a washing receptacle, holding means for dishes mounted therein for reciprocating movement, fluid controlled means for imparting reciprocating movement to said dish holding means, and means operated by the movement of said dish holding means for intermittently supplying fluid to said washing receptacle at a point above said dish holding means.

7. The combination with a washing receptacle, of dish holding means mounted therein for vertical reciprocating movement, a spray pipe arranged above the washing receptacle, hydraulic means for moving said dish holding means in one direction provided with means permitting the movement thereof in an opposite direction by gravity, valve controlled connections for admitting water pressure for actuating the hydraulic means for one movement of the dish holding means and discharging said water into the spray pipe on the opposite movement of said means, and trip means thrown into action by the movement of the dish holding means for controlling the fluid pressure relative to the hydraulic means.

8. The combination with a piston cylinder provided with a piston therein, of a receptacle, a dish holder mounted for reciprocating movement within said receptacle and connected to the piston within the piston cylinder, valved controlled means for admitting water under pressure into the piston cylinder for raising the piston therein and the discharge of fluid therefrom for the lowering of said piston, devices thrown into action by the movement of the dish holder for actuating the valve of the said valve controlled means, and connections between the said means and the washing receptacle for delivering therein the water discharged from the piston cylinder.

In testimony whereof I have signed my name to this specification in the presence of two subscribing witnesses.

JOSEPH LUTOLF.

Witnesses:
 N. A. ACKER,
 D. B. RICHARDS.